July 13, 1971 W. S. DURRELL ET AL 3,592,616
PROCESS FOR THE CONTINUOUS PRODUCTION OF CYANOGEN CHLORIDE
Filed May 15, 1968
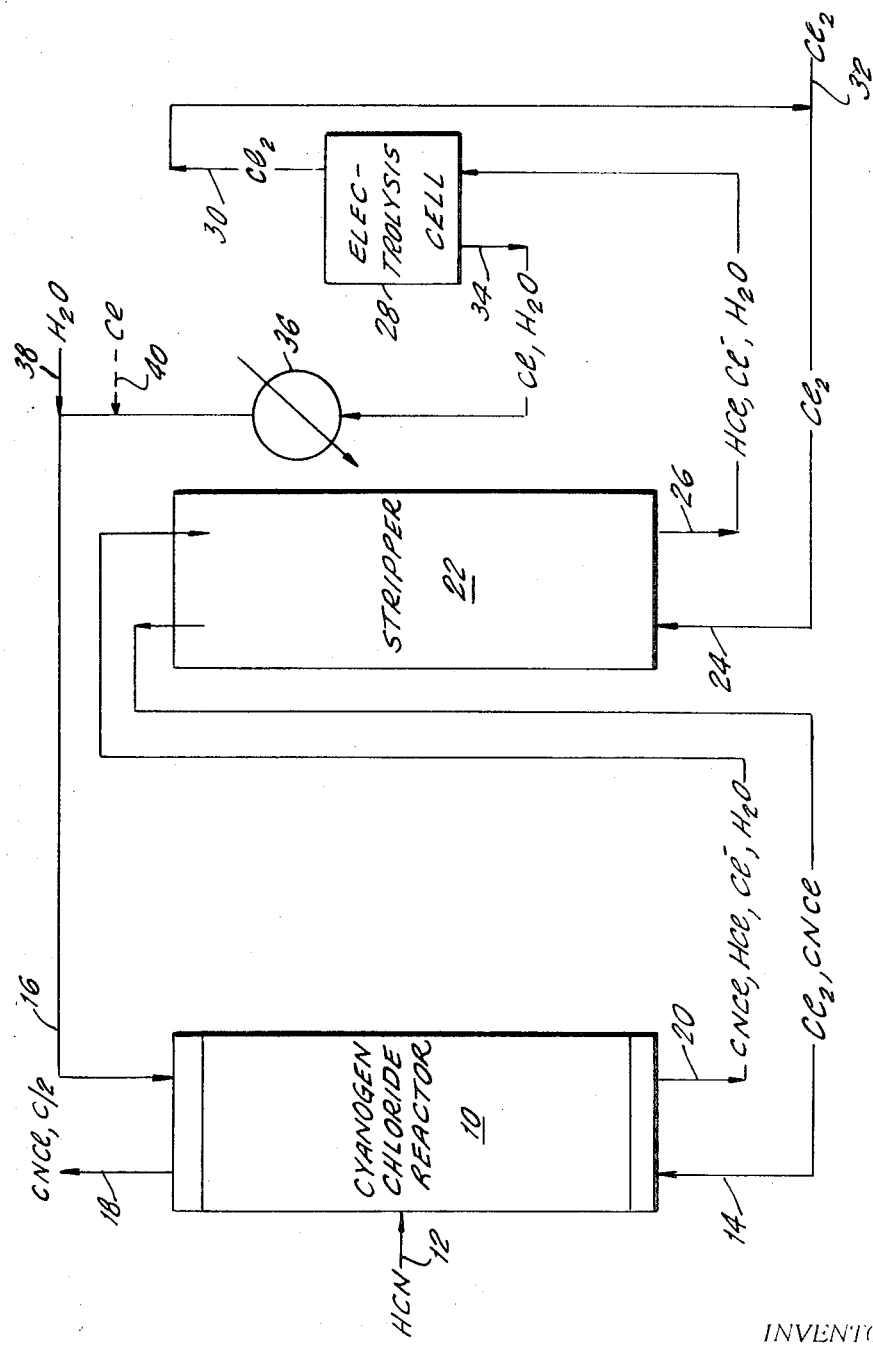
INVENTORS
WILLIAM S. DURRELL
ROBERT J. ECKERT, JR.
BY
KARL F. JORDA
ATTORNEY 3,592,616
PROCESS FOR THE CONTINUOUS PRODUCTION
OF CYANOGEN CHLORIDE
William S. Durrell and Robert J. Eckert, Jr., Mobile, Ala., assignors to Geigy Chemical Corporation, Ardsley, N.Y.
Filed May 15, 1968, Ser. No. 729,239
Int. Cl. C01c 3/00; C01b 7/08, 7/02
U.S. Cl. 23—359                              3 Claims

ABSTRACT OF THE DISCLOSURE

Cyanogen chloride is prepared in improved yield by a continuous process involving the electrolysis and recycle of hydrochloric acid formed as a by-product during the production of cyanogen chloride by reaction of hydrogen cyanide and chlorine gas. The recycle of chlorine formed in such electrolysis, as well as the hydrochloric acid-containing aqueous effluent therefrom, decreases the quantity of chlorine feed gas required for cyanogen chloride formation, manifestly improving the economics of such synthesis.

FIELD OF THE INVENTION

This invention relates to a process for manufacture of cyanogen chloride in high yield and commercially valuable concentrations by the reaction of hydrogen cyanide and chlorine gas.

BACKGROUND OF THE INVENTION

Cyanogen chloride is a valuable intermediate which may be trimerized to form cyanuric chloride, the latter, in turn, being a useful chemical intermediate in the synthesis of known chemotherapeutic agents, herbicides, dyes, brightening agents, synthetic resins, plastics, rubbers, explosives and other materials.

As described in U.S. Pat. No. 3,197,273, granted on July 27, 1965 to the assignee of the present invention, cyanogen chloride may be produced by the reaction of hydrogen cyanide and free chlorine, in accordance with the following equation:

$$HCN + Cl_2 \rightarrow CNCl + HCl$$

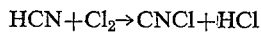

As described in the noted patent, the reaction is carried out by countercurrent contact of the HCN and $Cl_2$, water being additionally employed as a scrubbing agent to remove the hydrogen chloride by-product formed from the cyanogen chloride product stream. The latter is then removed overhead, the byproduct hydrochloric acid being removed as bottoms from the reactor column in dilute, e.g., from 2% to 3% aqueous solutions. It is not economically feasible to recover or reuse the very dilute hydrochloric acid byproduct so formed. Accordingly, it has heretofore been necessary to dispose of the large quantities of acid effluent as waste, while at the same time conforming to establish pollution control standards.

It has also been suggested, in copending application Ser. No. 608,129 filed on Jan. 9, 1967, now abandoned but refiled and issued as U.S. Pat. 3,499,737 and owned by the assignee of the present invention, that the problems of byproduct disposal or recovery may be overcome by sparging the chlorine gas into the cyanogen chloride reaction medium, the hydrochloric acid by-product thus being formed in higher concentrations, of the order of 10–20% of the reactor bottoms.

It is, accordingly, among the objects of the present invention to provide an improved process for the synthesis of cyanogen chloride from hydrogen cyanide and chlorine, in which process the hydrochloric acid byproduct of the reaction may be utilized to improve the overall commercial feasibility and desirability of the reaction.

SUMMARY OF THE INVENTION

In accordance with the present invention the hydrochloric acid-containing aqueous stream recovered as a by-product from the reaction of hydrogen cyanide and chlorine gas is electrolyzed to convert the HCl therein to chlorine gas, and the latter is recycled to the cyanogen chloride-forming reaction zone. The electrolysis of the hydrochloric acid byproduct converts what is frequently a useless waste material to a further source of chlorine reactant, thus reducing chlorine requirements in the formation of cyanogen chloride by as much as one-half and, consequently, markedly improving the economics of such synthesis. Moreover, there is thus provided a direct technique for the recovery and use of the hydrochloric acid byproduct of the synthesis, which eliminates the necessity for the disposal or, alternatively, concentration of the hydrochloric acid-containing effluent, in addition to improving the characteristics of the cyanogen chloride synthesis itself.

In the following description of preferred forms of the invention all parts and percentages have been given by weight, unless otherwise indicated.

The continuous, closed cycle process hereof is carried out in conjunction with the sparged column reaction system for cyanogen chloride formation described in the aforesaid copending application Ser. No. 608,129. Employing the method of such application, hydrochloric acid byproduct streams having HCl concentrations of the order of 10–20% may readily be formed, electrolyzed, and recycled in accordance with the present invention. It should, therefore, be understood that the disclosure of the sparging method of said application is incorporated herein by reference.

As described more fully hereinafter, the hydrochloric acid-containing by-product stream removed from the sparged column reaction zone, and containing from about 10% to 20% hydrochloric acid, is initially stripped with chlorine gas to remove any cyanogen chloride absorbed therein. After stripping, the hydrochloric acid-containing stream is electrolyzed in a coventional chlorine cell, chlorine gas being recovered overhead and recycled to the cyanogen chloride reactor. In accordance with a further feature of the invention, the aqueous effluent removed from the electrolysis cell, which contains from 5% to 20% chloride ion is further recycled to the cyanogen chloride reactor, in lieu of the water stream conventionally employed as a scrubbing medium for the hydrogen chloride formed during the reaction.

The electrolysis effluent may be admixed with further chloride ions, if desired, by the addition thereto of alkali metal or other soluble chloride salts. Prior to recycling, it has been found that up to about 6% of chloride ion by weight of the effluent can be added. The resulting hydrochloric acid-containing scrubbing medium should contain less than about 20%, and preferably less than about 10%, hydrochloric acid. The recycle of greater concentrations of hydrochloric acid to the cyanogen chloride reactor is not desirable in as much as such may result in the loss of substantial quantities of cyanogen chloride reaction product by hydrolysis to cyanuric chloride. In order to minimize any such undesirable hydrolysis, it is essential that the cyanogen chloride reaction medium contain less than 1 mole, and preferably less than 0.3 mole, of HCl per mole of cyanogen chloride formed therein. Employing suitable commercial production and recycle rates, it has thus been found desirable to maintain the indicated HCl recycle concentrations at no more than 20%, and preferably less than about 10%.

PREFERRED EMBODIMENTS OF THE INVENTION

The operation of a preferred form of the process of the present invention will be more fully apparent from consideration of the accompanying drawing, illustrating one desirable system for carrying out the cyanogen chloride synthesis hereof.

In the drawing, a sparged reactor 10 of the character described in the aforesaid copending application Ser. No. 608,129 is employed for the cyanogen chloride synthesis.

A hydrogen cyanide stream 12 and a chlorine gas stream 14 (containing minor proportions of cyanogen chloride stripped from the effluent from the reactor in the subsequent stripping stage) are reacted within the reactor 10, the reaction mixture being scrubbed by means of an aqueous HCl-containing stream 16 recycled as described below. The chlorine gas is fed to the reaction zone in excess of the equimolar proportions required for reaction with the hydrogen cyanide, the reaction mixture desirably containing from 1.0 to 1.15 moles chlorine and up to about 2.0 moles HCl, per mole of HCN reactant. The temperatures in the sparged reactor are maintained (as noted in the aforesaid copending application) within the range of from about 25° to 60° C. in the reaction section and at no more than about 65° to 70° C. in the scrubbing section thereof.

The cyanogen chloride product and excess chlorine gas is recovered in the overhead 18 from the sparged reactor, a hydrochloric acid-containing by-product stream 20 being removed as bottoms therefrom. The aqueous bottoms stream, which contains from about 10 to 20% hydrochloric acid, minor proportions of chloride ion and, in addition cyanogen chloride absorbed in the sparged reactor, is thereafter fed into a stripper zone 22 wherein the absorbed cyanogen chloride is stripped from the aqueous stream by means of a chlorine gas stream 24 fed countercurrent thereto. The cyanogen chloride thus recovered is recycled to the synthesis reactor as part of the chlorine gas feed stream 14.

The hydrochloric acid-containing stream 26 is removed from the stripper into the electrolysis cell 28. The electrolysis cell is a chlorine cell operated by procedures well known to those skilled in the art. One example is the electrolysis cell described in the published Dutch Patent application 6,510,493.

Chlorine gas produced in the electrolysis is removed overhead as stream 30 and is recycled, in admixture with make-up chlorine gas stream 32, as chlorine stream 24 fed through stripper 22 and into the cyanogen chloride reactor. The effluent stream 34 from the electrolysis cell is fed by means of pump 36 into admixture with a water makeup stream 38, the combined solution also being recycled, as stream 16, to the cyanogen chloride reactor.

If desired, additional chloride ions may be added to the recycle stream 34 by means of a make-up stream 40, comprising a solution of an alkali metal chloride, e.g., NaCl or KCl, or other suitable chloride salt. The recycle rates and amounts of soluble chloride ion added are, as noted hereinabove, so regulated that no more than about 1.0 mole of HCl is fed to the reaction mixture per mole of cyanogen chloride formed therein. Employing typical commercial recycle and production rates, the HCl recycle stream 34 may conveniently have an HCl concentration of up to about 10%.

The following examples illustrate specific embodiments of the cyanogen chloride synthesis of this invention:

Examples 1–4.—Recycle of hydrochloric acid-containing electrolysis effluent

Laboratory scale syntheses of cyanogen chloride from hydrogen cyanide and chlorine were carried out with varying quantities of hydrochloric acid being charged to the reactor column to simulate the recycle of the hydrochloric acid-containing effluent stream 16 of the reaction system illustrated in the accompanying drawing. The hydrogen cyanide reactant was pre-mixed with the simulated hydrochloric acid recycle in a 2,000 ml. flask at 0°–5° C., and then pumped into the reactor column by means of a Buchler Teflon pump.

Hydrochloric acid in concentrations of 5% (Examples 1, 2 and 4) and 10% (Example 3) was charged to the reactor at varying rates, the feeds being regulated so as to remove by-product streams containing substantially 15% (Examples 1 and 4) or 20% (Examples 2 and 3) hydrochloric acid. A control experiment was additionally performed (Control A), in which the hydrogen cyanide and chlorine feed rates were correlated with those of the runs summarized in Example 4 without, however, the introduction of any hydrochloric acid into the initial reaction mixture (water alone serving as a scrubbing medium). The hydrogen cyanide, chlorine and hydrochloric acid feed rates, and the analysis of the overhead and bottoms streams produced in the respective examples are set forth in the following tables.

TABLE I

Analysis for experiments simulating recycle of hydrochloric acid effluent from electrolysis to cyanogen chloride reactor and overhead

[1A—input/product analysis]

| | HCl feed (g./min.) | HCN feed (g./min.) | Cl₂ feed (g./min.) | (g./min.) | Overhead analysis, percent Cl₂ | HCN |
|---|---|---|---|---|---|---|
| Example: | | | | | | |
| 1 | ¹ 0.319 | 0.536 | 1.48 | 92–95 | 5–8 | 0.45 |
| 2 | ¹ 0.221 | 0.550 | 1.52 | 88–93 | 5–14 | 0.1–0.4 |
| 3 | ² 0.668 | 0.536 | 1.48 | 89–93 | 8–10 | 0.8–1.5 |
| 4 | ¹ 0.461 | 0.753 | 2.07 | 89–92 | 8–9 | ³ 1.0–3.0 |
| Control A ⁴ | | 0.753 | 2.08 | 84–91 | 6–13 | 2.0–4.0 |

[1B—By-product analysis, conversion and hydrolysis loss]

| | HCl, percent | HCN, percent | N (Kjeldahl), percent | Percentage conversion (based on HCl) | Hydrolysis loss (based on HCN), percent⁵ |
|---|---|---|---|---|---|
| Example: | | | | | |
| 1 | 14–15 | (⁶) | .01 | 94.5 | 0.30 |
| 2 | 19–20 | (⁶) | .04 | 97.0 | 0.70 |
| 3 | 19–19.4 | (⁶) | .04–.06 | 95.4 | 1.0–1.5 |
| 4 | 14–15 | .2–.3 | .01 | 90.0 | 0.26–0.52 |
| Control A | 14.7–15.8 | (⁶) | 0.0002–0.0005 | 95.6 | 0.004–0.008 |

¹ 5% HCl solution used.
² 10% HCl solution used.
³ There was a tendency towards slug formation throughout the top half of the column during this run.
⁴ A slight pressure was maintained over the hydrogen cyanide feed flask during this run in order to avoid loss of HCN by evaporation.
⁵ Quantity of cyanogen chloride lost by hydrolysis to cyanogen chloride. The quantity of hydrolysis was determined after nitrogen stripping of CNCl dissolved in the column bottoms.
⁶ Trace amounts.

It will be seen that the cyanogen chloride synthesis reaction proceeded normally when the recycle of HCl was simulated. With 5% HCl introduced into the reaction system and 15% and 20% HCl in the column bottoms, the hydrolysis losses were only 0.30% and 0.7%, respectively. At a 10% HCl feed and a 20% HCl bottoms concentration, it will be noted that hydrolysis losses of 1.0–1.5% resulted. In both instances only traces, if any, HCN was detected in the by-product mixtures removed as bottoms.

Examples 5–8.—Recycle of sodium chloride-containing electrolysis effluent

Laboratory scale syntheses were carried out in the manner described in the preceding examples, with sodium chloride stock solutions being added to the reaction mixture in lieu of hydrochloric acid to simulate the addition of soluble chloride ions to the electrolysis effluent as described hereinabove. For such purposes 4%, 6%, 8% and 10% NaCl solutions in aqueous HCN (Examples 5, 6, 7 and 8, respectively) were chilled to 0°–5° C. and fed over a 5-hour period to the sparged gas reactor. In each instance after allowing the column to reach equilibrium, bottom samples were collected in an iced flask until 125 ml. were collected, the samples then being assayed for HCN and HCl, chlorine added thereto to destroy any residual HCN and the mixtures immediately stripped with $N_2$ gas in a 6-foot packed column. Two control runs (Controls B and C), employing a pure water scrubbing medium, were also conducted for comparison purposes. The feed rates and analyses of the respective streams were as follows:

TABLE II

Analysis of Experiments Simulating Recycle of Sodium Chloride-Containing Effluent From Electrolysis to Cyanogen Chloride Reactor and Overhead

[IIA—input/product analysis]

| Example: | NaCl feed (g./min.) | HCN feed (g./min.) | $Cl_2$ feed (g./min.) | Overhead analysis, percent | | | |
|---|---|---|---|---|---|---|---|
| | | | | CNCl | $Cl_2$ | HCN | $CNCl_2$[1] |
| 5[2] | 0.193 | 0.770 | 2.12 | 84–94 | 5–14 | 1.0–3.6 | 0.2–0.6 |
| 6 | 0.294 | 0.564 | 1.55 | 86–94 | 4–13 | 0.82–1.2 | 0.9–1.5 |
| 7 | 0.462 | 0.545 | 1.51 | 84–92 | 5–15 | 0.3–1.2 | 0.5–1.0 |
| 8[3] | 0.480 | 0.771 | 2.12 | 72–88 | 9–25 | 1.0–5.0 | |
| Control B | | 0.753 | 2.18 | 84–91 | 6–13 | 2.0–4.0 | |
| Control C | | 0.732 | 2.01 | 87–90 | 3–13 | 2.0–3.0 | 0.2–0.6 |

[IIB—By-product analysis, conversion and hydrolysis loss]

| Example: | HCl (vol. percent) | N (Kjeldahl) (percent) | Percentage conversion (based on HCN) | Hydrolysis loss (based on HCN)[4] (percent) |
|---|---|---|---|---|
| 5 | 15.1–20.3 | .007–.12 | 85–90 | 0.13–1.84 |
| 6 | 12.7–15.3 | .002–.015 | 90–100 | 0.04–0.30 |
| 7 | 10.0–12.2 | .001–.004 | 94–100 | .002–0.11 |
| 8 | 17.0–19.0 | [5]0.1 | 85–90 | [5]1.8 |
| Control B | 14.7–15.8 | .0002–.0004 | [5]95 | .004–.008 |
| Control C | 17.0–21.0 | .001–.01 | 90–100 | 0.01–0.18 |

[1] The $CNCl–Cl_2$ content was determined employing gas chromatography. The overhead stream was additionally analyzed for $NCl_3$, all streams tested giving negative results.
[2] The sparging operation in this run was good; nevertheless, some solid precipitated toward the end of the run.
[3] The sparging operation during this run was relatively poor, solid NaCl settling out during the run.
[4] Quantity of cyanogen chloride lost by hydrolysis to cyanogen chloride. The quantity of hydrolysis was determined after nitrogen stripping of CNCl dissolved in the column bottoms.
[5] Calculated as the average.

It will be seen from the preceding table that employing an 8% NaCl feed-12% HCl bottom effluent, there was only a 0.02–0.11% hydrolysis loss, and with a 6% NaCl feed-15% HCl bottoms mixture the hydrolysis loss was from 0.04 to 0.30%. With greater proportions of sodium chloride incorporated in the feed mixture the hydrolysis loss increased, a 3–4% loss occurring in the run in which a 10% NaCl solution was fed for reaction and a 20% hydrochloric acid-containing effluent was produced. It thus appears that the addition of soluble chloride salts to the electrolysis effluent produces substantial hydrolysis losses only at the higher proportions and concentrations of chloride salts contained therein.

It may thus be seen that the present invention provides an improved process for the production of cyanogen chloride, which process facilitates the efficient and economic conversion and recycle of the hydrochloric acid-containing by-product formed in such synthesis. It will be understood that various changes may be made in the preferred embodiments of the process described hereinabove; accordingly, the preceding description is intended as illustrative only and should not be considered in a limiting sense.

What is claimed is:
1. A process for the manufacture of cyanogen chloride from hydrogen cyanide and chlorine which comprises:
(a) feeding hydrogen cyanide and chlorine gas in admixture into a reaction zone maintained at temperatures within the range of from 25° to 60° C.;
(b) scrubbing the reaction mixture within said zone with a hydrochloric acid-containing stream having an HCl concentration of about 10 to 20% by weight thereof, the scrubbed reaction mixture containing from 1.0 to 1.15 moles of chlorine and up to about 2.0 moles of hydrochloric acid per mole of hydrogen cyanide reactant;
(c) recovering cyanogen chloride gas as overhead from said reaction zone;
(d) removing a hydrochloric acid-containing stream as bottoms from said reaction zone, said stream containing about 10 to 20% by weight hydrochloric acid;
(e) stripping dissolved cyanogen chloride from the hydrochloric acid-containing stream by contact with chlorine gas within a stripper zone;
(f) feeding the cyanogen chloride-containing chlorine gas stream removed from said stripper zone into said reaction zone;
(g) electrolyzing the stripped hydrochloric acid-containing effluent from said stripper zone to form chlorine gas therefrom;
(h) recycling the chlorine gas formed in step (g) to said stripper zone; and
(i) recycling the effluent remaining from step (h) to step (b) to provide said hydrochloric acid-containing scrubbing medium employed therein.
2. The process as defined in claim 1, in which at least one soluble alkali metal chloride is added to the effluent stream recycled to said reaction zone in step (i), in amounts up to about 6% by weight of such stream.
3. The process as defined in claim 2 in which the alkali metal chloride is sodium chloride.

References Cited

UNITED STATES PATENTS 2,672,398 3/1954 Huemer et al. _____ 23—359
2,719,822 10/1955 Kassel _____ 23—154

OTHER REFERENCES

Price et al.: "The Preparation of Cyanogen Chloride on a Large Laboratory Scale," Jour. Soc. Chem. Ind., vol. 39 (1920), pp. 98T to 101T.

OSCAR R. VERTIZ, Primary Examiner

H. S. MILLER, Assistant Examiner

U.S. Cl. X.R.

23—154, 219